(12) United States Patent
Stephens et al.

(10) Patent No.: US 11,526,826 B2
(45) Date of Patent: Dec. 13, 2022

(54) REMOTE DEFINITION OF METRICS

(71) Applicant: NOKIA SOLUTIONS AND NETWORKS OY, Espoo (FI)

(72) Inventors: Paul Stephens, Long Grove, IL (US); Alistair Urie, Issy les Moulineaux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/090,329

(22) Filed: Nov. 5, 2020

(65) Prior Publication Data
US 2021/0142257 A1    May 13, 2021

(30) Foreign Application Priority Data

Nov. 7, 2019    (FI) ..................................... 20195954

(51) Int. Cl.
*G06Q 10/00*    (2012.01)
*G06Q 10/06*    (2012.01)
*G06Q 10/10*    (2012.01)

(52) U.S. Cl.
CPC ...  *G06Q 10/06393* (2013.01); *G06Q 10/0637* (2013.01); *G06Q 10/10* (2013.01)

(58) Field of Classification Search
CPC ........... G06Q 10/06393; G06Q 10/063; G06Q 10/10; G06Q 10/0631; G06Q 10/06375; G06Q 10/0639; G06Q 10/06395; G06Q 10/0637

See application file for complete search history.

(56) References Cited

U.S. PATENT DOCUMENTS

| 2009/0075648 A1* | 3/2009 | Reed | H04L 41/0823 455/424 |
| 2009/0181665 A1* | 7/2009 | Sater | G06Q 10/0631 455/424 |
| 2015/0044974 A1* | 2/2015 | Futaki | H04W 24/02 455/67.11 |
| 2015/0106166 A1* | 4/2015 | Gutierrez, Jr. | G06Q 10/063 705/7.39 |

(Continued)

FOREIGN PATENT DOCUMENTS

WO    WO 2019/170391 A1    9/2019

OTHER PUBLICATIONS

Kuklinski, Slawomir, and Lechoslaw Tomaszewski. 2019. Key performance indicators for 5g network slicing. Proceedings of the 2019 IEEE Conference on Network Softwarization: Unleashing the Power of Network Softwarization, NetSoft 2019 (06): 471 (Year: 2019).*

(Continued)

*Primary Examiner* — William S Brockington, III
(74) *Attorney, Agent, or Firm* — Squire Patton Boggs (US) LLP (57) ABSTRACT

According to an aspect there is provided a method comprising receiving a definition for determining a key performance indicator of a cellular communication network based on raw metrics data, receiving a request for executing an action of determining the key performance indicator according to the definition received, as a response to receiving the request, obtaining the raw metric data and determining the key performance indicator according to the definition and transmitting the key performance indicator using an interface.

11 Claims, 5 Drawing Sheets

(56) References Cited

U.S. PATENT DOCUMENTS

| | | | |
|---|---|---|---|
| 2015/0156714 A1* | 6/2015 | Xia | H04W 24/08 |
| | | | 455/405 |
| 2015/0287059 A1* | 10/2015 | Ouyang | G06Q 10/06393 |
| | | | 705/7.31 |
| 2015/0373563 A1* | 12/2015 | Chou | H04W 36/165 |
| | | | 370/252 |
| 2016/0150574 A1 | 5/2016 | Edge et al. | |
| 2016/0157240 A1* | 6/2016 | Dribinski | H04L 43/08 |
| | | | 370/329 |
| 2016/0323758 A1 | 11/2016 | Goerke et al. | |
| 2017/0135003 A1 | 5/2017 | Suarez | |
| 2017/0230835 A1 | 8/2017 | Saffre et al. | |
| 2018/0270672 A1* | 9/2018 | Chan | H04L 41/147 |
| 2020/0059805 A1* | 2/2020 | Kwan | H04L 43/08 |
| 2020/0383040 A1* | 12/2020 | Young | H04W 88/18 |

OTHER PUBLICATIONS

Office Action dated Feb. 27, 2020 corresponding to Finnish Patent Application No. 20195954.

Finnish Search Report dated Feb. 27, 2020 corresponding to Finnish Patent Application No. 20195954.

Communication of Acceptance dated Jul. 17, 2020 corresponding to Finnish Patent Application No. 20195954.

3GPP TS 36.423 V15.7.0 (Sep. 2019), Technical Specification, 3rd Generation Partnership Project; Technical Specification Group Radio Access Network; Evolved Universal Terrestrial Radio Access Network (E-UTRAN); X2 application protocol (X2AP) (Release 15), Oct. 2, 2019.

* cited by examiner

REMOTE DEFINITION OF METRICS

FIELD

The following embodiments relate to cellular communication systems and ensuring interoperability between various parts of the network.

BACKGROUND

Various methods may be utilized to obtain information regarding a device. For example, global navigation satellite system may be utilized by having an apparatus dedicated for the satellite-based positioning. In a cellular communication system that is capable of transmitting data and/or voice location positioning data may also be determined based on transmitted signals. There may also be regulations that require a cellular communication network to be able to position a device connected to the cellular communication network.

US20170135003A1 discloses a communication system comprising a first base station operating a first cell and a second base station operating a second cell. The first base station determines that load should be offloaded from the first cell towards the second cell based on a comparison of respective measurement result of a first type obtained for the first and second cells. The first base station controls load balancing based on a second comparison of respective measurement result of a second type for each of the first and second cells, wherein a second condition, when met, indicates that the base station operating the second cell will not offload load to the first cell based on the respective measurement result of the second type for the first and second cells. WO2019170391 discloses that certain wireless communication systems may benefit from a method and application programming interface between a radio access network and a controller to optimize inter-frequency load balancing (IFLB). A method can include receiving policy inputs regarding how the IFLB should be operated. The method can also include negotiating a functional split of IFLB-related functions for the purposes of executing inter-frequency load-balancing.

BRIEF DESCRIPTION OF THE INVENTION

According to an aspect, there is provided a method comprising: receiving a definition for determining a key performance indicator of a cellular communication network based on raw metrics data, receiving a request for executing an action of determining the key performance indicator according to the definition received, as a response to receiving the request, obtaining the raw metric data and determining the key performance indicator according to the definition and transmitting the key performance indicator using an interface.

According to another aspect, there is provided an apparatus, comprising: at least one processor, and at least one memory including a computer program code, wherein the at least one memory and the computer program code are configured, with the at least one processor, to cause the apparatus to: receive a definition for determining a key performance indicator of a cellular communication network based on raw metrics data, receive a request for executing an action of determining the key performance indicator according to the definition received, as a response to receiving the request, obtain the raw metric data and determine the key performance indicator according to the definition and transmit the key performance indicator using an interface.

According to another aspect there is provided an apparatus comprising means for receiving a definition for determining a key performance indicator of a cellular communication network based on raw metrics data, receiving a request for executing an action of determining the key performance indicator according to the definition received, as a response to receiving the request, obtaining the raw metric data and determining the key performance indicator according to the definition and transmitting the key performance indicator using an interface.

According to another aspect there is provided a computer program product readable by a computer and, when executed by the computer, configured to cause the computer to execute a computer process comprising: receiving a definition for determining a key performance indicator of a cellular communication network based on raw metrics data, receiving a request for executing an action of determining the key performance indicator according to the definition received, as a response to receiving the request, obtaining the raw metric data and determining the key performance indicator according to the definition and transmitting the key performance indicator using an interface.

According to another aspect there is provided a computer program product comprising computer-readable medium bearing computer program code embodied therein for use with a computer, the computer program code comprising code for executing receiving a definition for determining a key performance indicator of a cellular communication network based on raw metrics data, receiving a request for executing an action of determining the key performance indicator according to the definition received, as a response to receiving the request, obtaining the raw metric data and determining the key performance indicator according to the definition and transmitting the key performance indicator using an interface.

LIST OF DRAWINGS

In the following, the invention will be described in greater detail with reference to the embodiments and the accompanying drawings, in which.

DESCRIPTION OF EMBODIMENTS

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

Figure 1:
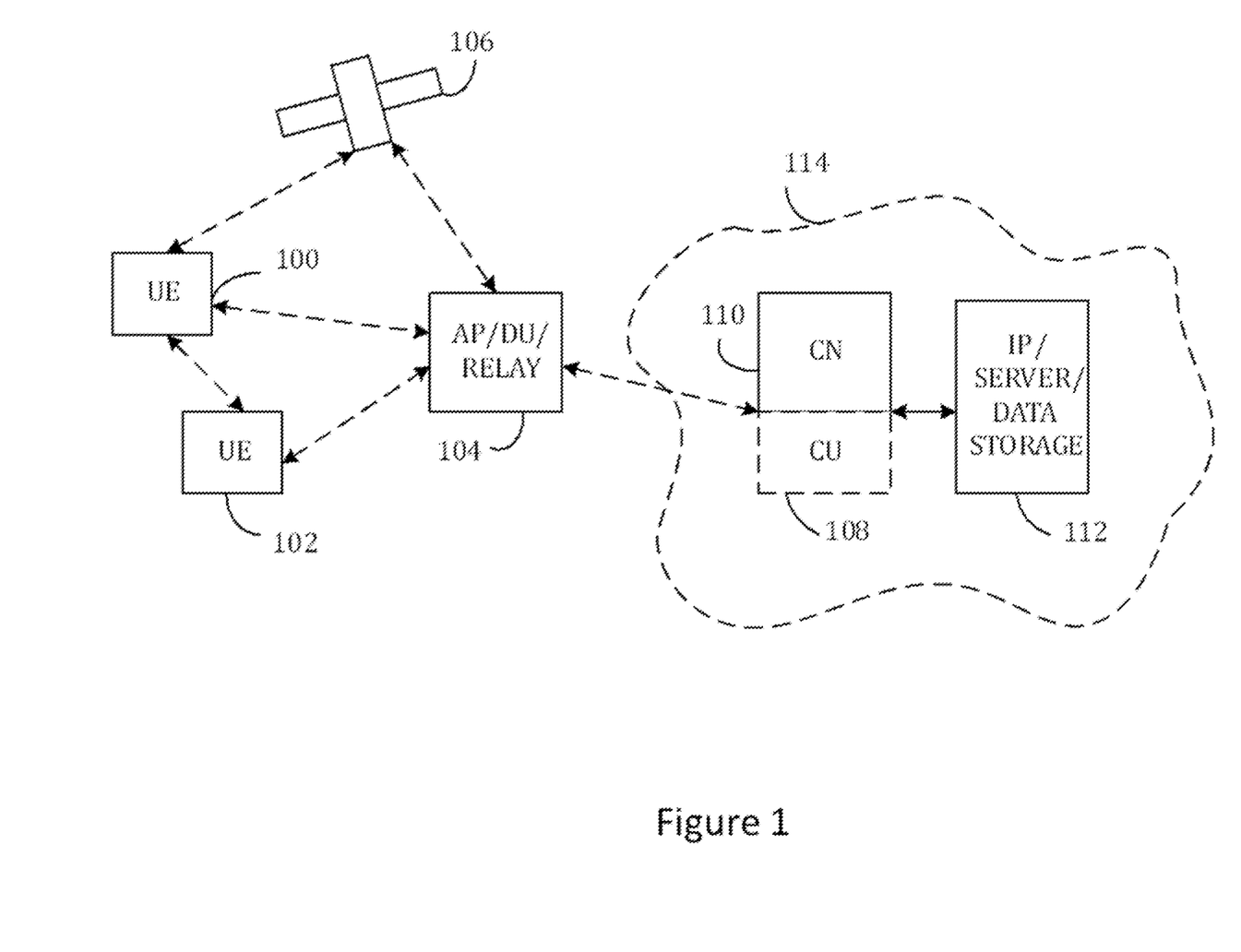
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. It is to be noted that in some example embodiments a split gNodeB architecture, as defined in 3GPP, may be followed. In such an example embodiment a central unit, CU, associated with a gNodeB is located separate from an element such as 104 illustrated in FIG. 1 and may be located as part of an element 114 as the CU 108. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage.

A communication system, such as a cellular communication system, typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of terminal devices (UEs) to external packet data networks, or mobile management entity (MME), etc. It is to be noted that the NGC may comprise functionalities such as access and mobility management, AMF, session management function, SMF and/or user plane function, UPF.

The terminal device (also called as UE, user equipment, user terminal, user device, etc.) illustrates one type of an apparatus to which resources on the air interface are allocated and assigned to, and thus any feature described herein with a terminal device may be implemented with a corresponding apparatus, such as a relay node. An example of such a relay node is a layer 2 relay (self-backhauling relay) towards the base station. Such a relay node may contain a mobile termination (MT) part and a Distributed Unit (DU) part. A CU (centralized unit) may coordinate the DU operation via F1AP-interface for example.

The terminal device may, in some examples, refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Yet, a vehicle may also be considered as a terminal device for example if it is configured to connect to a wireless network such as a cellular communication network. It should be appreciated that a user device may also be a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments an MT part of integrated access and backhaul (IAB) node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is only an example of a part of a radio access system and in practice, the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

For the purpose of achieving high-speed broadband communication, frequencies with short wavelength may be utilized. Examples of such frequencies include millimetre wave and also other frequency bands, such as unlicensed band at 5 GHz. Millimetre waves, mmWaves, have short wavelengths that range from 10 millimeters to 1 millimeter and the spectrum is the frequency band between 30 GHz and 300 GHz. It may also be possible to use technologies defined for mmWave also below 30 GHz. For example, 28 GHz could be used. Some sub-bands of the mmWave frequency band may require a license from the regulators while other sub-bands may be unlicensed and thereby available without a license. Yet the short wavelength of mmWave causes high attenuation and the waves may be absorbed by gases in the atmosphere as well as attenuated by buildings and other obstacles in the environment.

Because of the high attenuation, the cell coverage achieved by one access node operating in the mmWave bandwidth is relatively small when comparing to the cell coverage of a 4G access node operating on a lower frequency band for example. Due to the relatively small cell coverage achieved by an access node, there may be a need for having more access nodes to cover a geographical area. It may be that not all such access nodes are equipped with a wired backhaul connection. If an access node does not have a wired backhaul connection, the access node may utilize the wireless channel resources to connect to an access node that does have a wired backhaul connection or the access node may connect to another access node and the other access node is then connected to an access node with a wired backhaul connection. The access node may therefore be called as an integrated access and backhaul, IAB, node. The access node that does have the wired backhaul connection and to which the IAB node connects to for backhauling, may be called as a donor node. In the case of self-backhaul (a.k.a. integrated access and backhaul) the donor node uses the same wireless channel to serve terminal devices that are within a cell provided by the donor access node and to provide a wireless backhaul connection for the IAB node. Out-of-band relaying corresponds to a scenario without access terminal devices in a spectrum where the out-of-band relaying takes place. In some examples, a donor node may also have out-of-band relayed backhaul connection instead of a wired backhaul connection.

By having donor nodes and IAB nodes, the coverage of a communication system may be extended without having to equip all access nodes with a wired backhaul connection. This may be useful for example if the communication system operates using an unlicensed frequency band, like at or around 60 GHz. As the donor node (and/or CU) is configured to have an overall control of the radio resources, coverage extension may be achieved with minimal manual efforts and self-configuration of the communication system may be enabled.

Figure 2A:
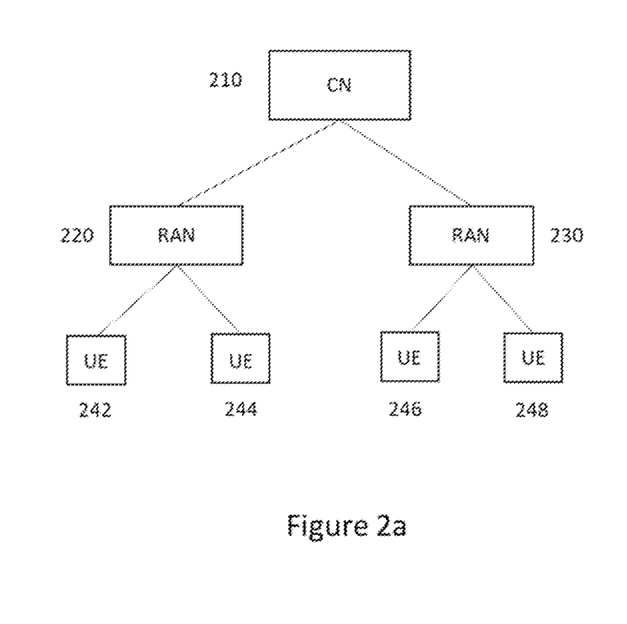
FIGS. 2a and 2b illustrate an exemplary embodiment of a radio access network.

FIG. 2a illustrates an exemplary embodiment of a radio access network RAN. RAN may be understood as a part of a cellular communication network that implements radio access technology. In a conceptual view RAN may be understood as residing between a terminal device and a core network, CN, 210. In some exemplary embodiments, RAN functionality may be provided by a chip such as a silicon chip. The chip may in some exemplary embodiments be comprised in an apparatus. In the exemplary embodiment of FIG. 2a, there are two RAN nodes, 220 and 230, that are apparatuses configured to provide RAN functionality. RAN nodes may also be called as RAN equipment. Terminal devices 242 and 244 are connected to and thereby served by the RAN node 220 and the terminal device 246 and 248 are connected to and thereby served by the RAN node 230. An example type of RAN is EUTRAN which is Long Term Evolution (LTE) high speed and low latency radio access network. Another example type is C-RAN which may also be referred to as Cloud RAN. C-RAN may be understood as a centralized, cloud computing-based architecture for radio access networks. It provides support for 2G, 3G, 4G and 5G wireless communication standards. Further, RAN nodes 220 and 230 may be an eNodeB or a gNodeB.

Figure 2B:
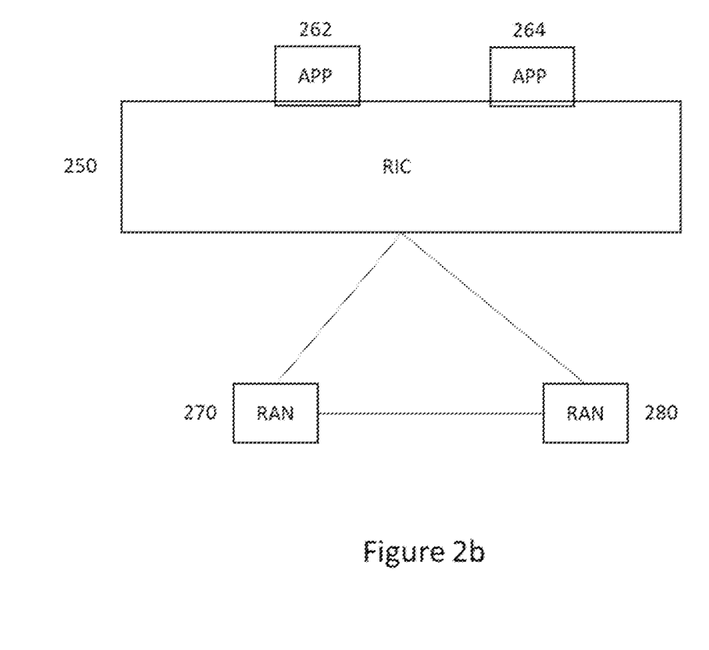

FIG. 2b illustrates an exemplary embodiment in which there are two RAN nodes 270 and 280 such as an eNodeB or a gNodeB. In this exemplary embodiment RAN node 270 is an eNodeB and RAN node 280 a gNodeB. RAN nodes are served by a RAN Intelligent Controller, RIC, 250. The RIC 250 may be a near-realtime RIC. Near-realtime may be understood such that some latency is acceptable as long as it is less than a threshold latency. The RIC 250 is a platform that provides services to the RAN nodes connected to it. The services may comprise for example mobile load management, MLB, services that enable to better distribute traffic in the network. For example, overloaded cells may identify potential under-utilized nearby RAN Nodes and attempt to shift part of their traffic towards them. MLB has been introduced in 3GPP standards as well. The services provided by the RIC platform may further comprise a policy service that enables the RIC 250 to trigger a RAN Node, such as RAN Node 270 or 280 to execute certain pre-determined actions as a response to a triggering event. The services provided may be understood as applications that may also be called as App or xApp. It is to be noted that there may also be other applications and that some applications may be third party applications. In this exemplary embodiment, there are applications 262 and 264. Application 262 provides MLB and application 264 provides policy. It is to be noted that in some other exemplary embodiments a policy may be provided by other applications as well. In some exemplary embodiments, the MLB may provide a policy to one or more target RAN Nodes. Thus, there may not be a need for an application that is dedicated to providing a policy in some exemplary embodiments. The RIC 250 in this exemplary embodiment hosts mobility functions and functions allowing the RIC 250 to steer traffic to resources that are likely to meet quality of metrics required by individual connections. At the same, the overall spectral efficiency of the network is maximized, or it is the target to maximize the overall spectral efficiency.

RAN nodes, such as 220, 230, 270 and 280 may be provided by different vendors. Yet, they may be able to communicate using an X2 interface for example. The X2 interface is an interface that allows two eNodeBs to communicate with each other. This may be beneficial for example if it is to be detected if a neighbour cell has more capacity. Although the X2 interface allows eNodeBs to communicate even if the were provided by different vendors, lack of standardizing metrics to be derived from raw data may hinder interoperability. For example, 3GPP defines composite available capacity CAC measurement that may be exchanged on the X2 thereby supporting MLB. However, key performance indicators, KPIs, derived from raw metrics data obtained by a RAN node are not defined. Thus, it may be difficult to have an efficient interoperability in case different vendors derive different KPIs from raw metrics data. Raw metrics data may be understood as measurement data that is obtained from sensors or received from another apparatus and that has not been processed further for example by doing calculations.

Figure 3:
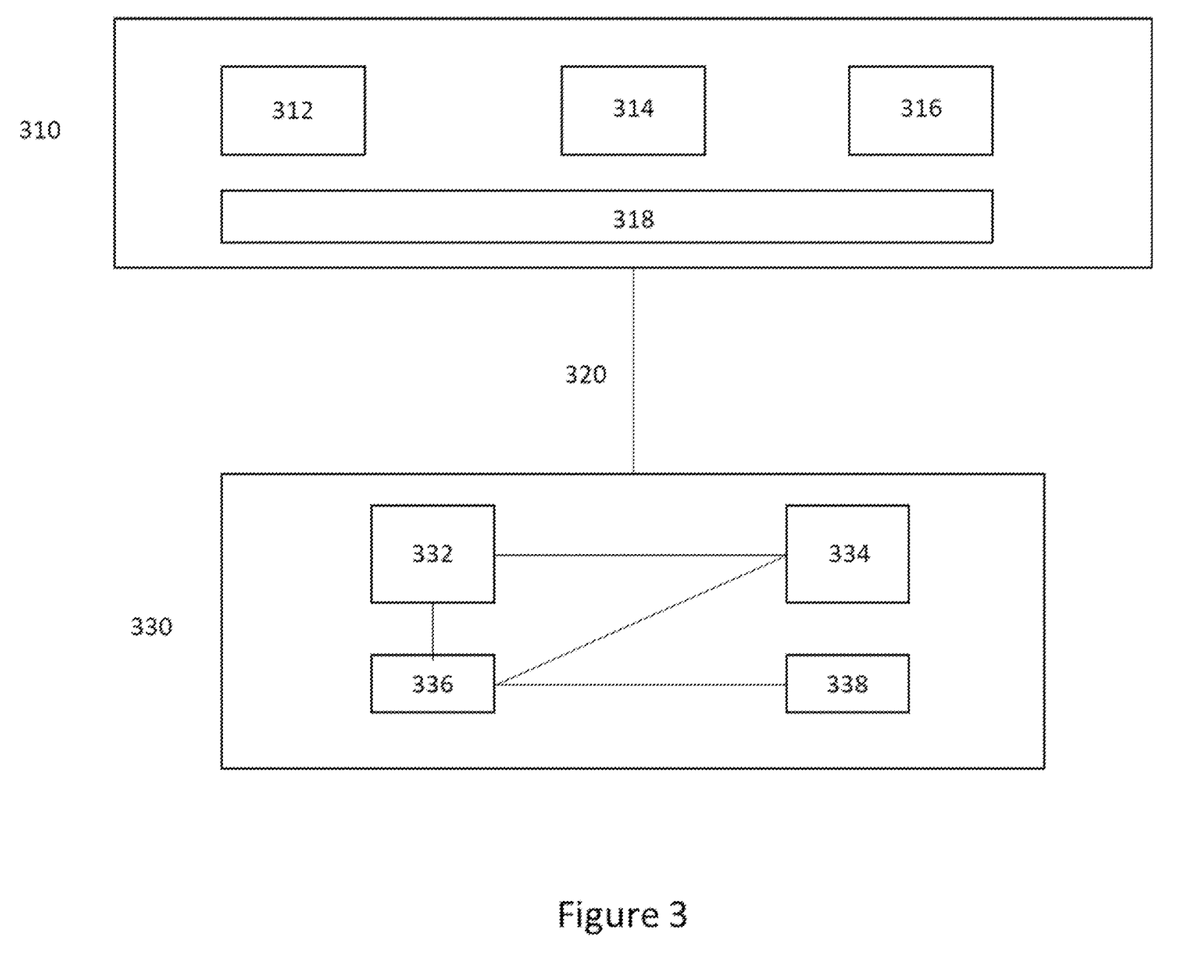
FIG. 3 illustrates an exemplary embodiment of a RAN intelligent controller.

FIG. 3 illustrates another exemplary embodiment of a RIC 310 and a RAN node 330. The RIC and the RAN node 330 are connected over an E2 interface 320. The RIC 310 in this exemplary embodiment comprises a unit, that may be understood as a logical unit, for RAN Data Analytics, 318. The RIC 310 may also comprise units, that may also be understood as a logical units 312, 314 and 316. The unit 312 in this exemplary embodiment is a unit for QoS optimization, unit 314 is a unit for slicing optimization and unit 316 is a unit for mobility optimization in this exemplary embodiment. In some other exemplary embodiments there may be other units as well. The RIC 310 in this exemplary embodiment provides network intelligence, resource assurance and resource control. For example, the RIC 310 provides policy enforcement, handover optimization, radio-link management, advanced SON, load balancing and slicing policy.

These functionalities provided by the RIC 310 may be beneficial for example in the context of smart factories and/or IoT as they may, at least partly, enable carving out namespaces for example. The functionalities provided by the RIC 310 may also be beneficial in the context of connected cars, shipping, logistics, tracking, asset management and healthcare.

The RAN node 330 in this exemplary embodiment is a gNodeB. The RAN node 330 comprises a gNodeB-CU-Control Plane, gNodeB-CU-CP, 332, which may be understood as a logical node hosting the RRC and the control plane part of the PDCP protocol of the gNodeB-CU for the gNodeB. The gNodeB-CU-CP terminates an E1 interface connected with a gNodeB-CU-User Plane, gNodeB-CU-UP, 334, which may be understood as a logical node hosting the user plane part of the PDCP protocol of the gNodeB-CU for a gNodeB, and the user plane part of the PDCP protocol and the SDAP protocol of the gNodeB-CU for the gNodeB. The gNodeB-CU-UP terminates the E1 interface connected with the gNodeB. It is to be noted that a gNodeB may comprise a gNodeB-CU-CP, multiple gNodeB-CU-UPs and multiple gNodeB-DUs. In this exemplary embodiment there is a distributed unit, DU, 336 that is connected to a remote radio unit, RRU, 338 via next generation front haul interface that is in this exemplary embodiment defined by ORAN, open radio access network. Additionally, the gNodeB-CU-CP 332 and the gNodeB-CU-UP 334 may be connected to the DU 336.

In this exemplary embodiment, the DU comprises an interface that allows the DU to access raw metrics data based on which the CAC may be determined. Thus, it may be considered that the DU generates raw metrics data and obtaining raw metrics data comprises the DU generating raw metrics data. The determination may be achieved for example by calculations. If an operator defines how the CAC is to be determined, the CAC may thus be determined independent of a definition provided by a vendor and such metric may be communicated to a neighbour cell using the X2 interface and/or to the RIC 310 using the E2 interface. This may enhance interoperability and help to manage overall load balance and may therefore be beneficial.

Figure 4:
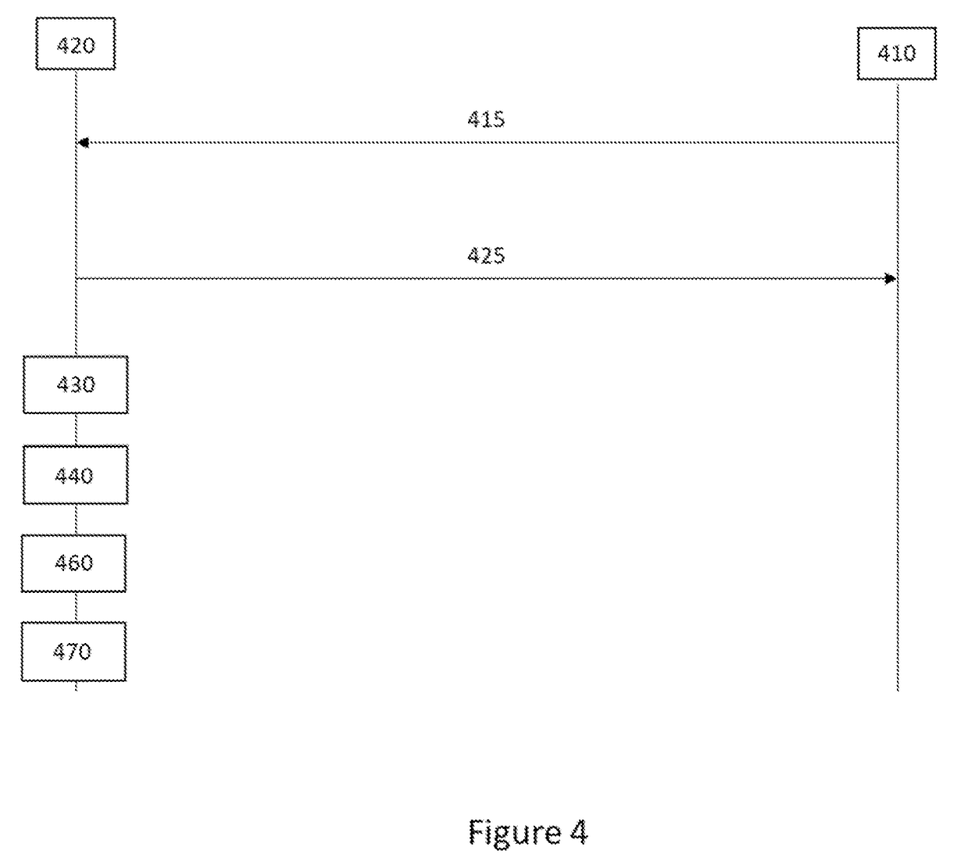
FIG. 4 illustrates an exemplary embodiment of obtaining raw metrics measurement data.

In order for an operator to be able to provide the definition regarding how a CAC is to be determined based on raw metrics data, there is to be an interface through which such definitions may be provided. The E2 interface supports a policy-based implementation that enables a RIC to define policies that are to be implemented by a RAN node, such as RAN Node 330 or RAN Nodes 270 and 280. The policy-based implementation may be understood as a service such as policy service 264. It is to be noted though that in some exemplary embodiments, the policy may be provided by any application on RIC. A subscription message may be transmitted over the E2 interface to configure a policy defined by RIC in a RAN node. This is illustrated in FIG. 4 in which a RIC 410 transmits a RIC subscription request 415 to a RAN Node 420. The RAN Node then responds by transmitting a RIC subscription response 425. In this manner, a subscription may be established between RIC and a RAN Node. The subscription comprises a test condition and one or more actions associated with the test condition. When the test condition occurs, the one or more actions associated with it are executed by the RAN node. An example test condition is report. The action associated with the report is to send a pre-defined set of information to the RIC. Another example of a test condition is policy. An action associated with the policy is to execute a pre-defined set of instructions by the RAN Node. In this exemplary embodiment, a policy is used to define how a CAC is to be determined based on raw metrics data. The determination may comprise using specific algorithms for example. Further, in this exemplary embodiment, an instance of the policy is utilized that enables RIC to request execution of the subscription on receipt. This enables an X2 CAC request report to be utilized. So, in this exemplary embodiment, receiving the X2 CAC request report, by the RAN node, is a trigger and the associated action is to determine the CAC from the raw metrics data according to the definition received. The received definition may, in some examples, comprise an algorithm to be used to determine the CAC.

The determined CAC may then be transmitted to a neighbour cell using the X2 interface for example or to the RIC using the E2 interface for example. The action 430 in FIG. 4 illustrates obtaining raw metrics measurement data. The action 440 illustrates determining, based on a received definition of determining, the CAC. It is to be noted that the CAC is one possible KPI and other KPIs may be determined as well based on definitions received for defining them. Action 460 illustrates transmitting the CAC, and/or other KPIs determined using E2 interface and action 470 illustrates transmitting the CAC, and/or other KPIs determined using X2 interface. It is to be noted that in some exemplary embodiment both actions 460 and 470 may be executed while in some other exemplary embodiment only one of the may be executed.

It is to be noted that the policy used may comprise definitions. It may define for example mapping between policy parameter naming and internal parameter within the RAN such as CM parameters, OAM exposed parameters, Static values and PM parameters. For PM parameters, an end time and/or averaging period may further be defined to avoid an algorithm that is ambiguous regarding which time period a specific measure refers to. In case the specific measure exists for multiple intervals within a period of interest, a single measure may be derived from the existing data by applying operations such as average, sum, max or min rules.

The exemplary embodiments described above may have the advantage of providing an operator with an ability to remotely define metrics that address both programmability and multivendor interoperability. IT may also have the advantage of providing feedback on tuning of configuration parameters used in the definition of a KPI.

Figure 5:
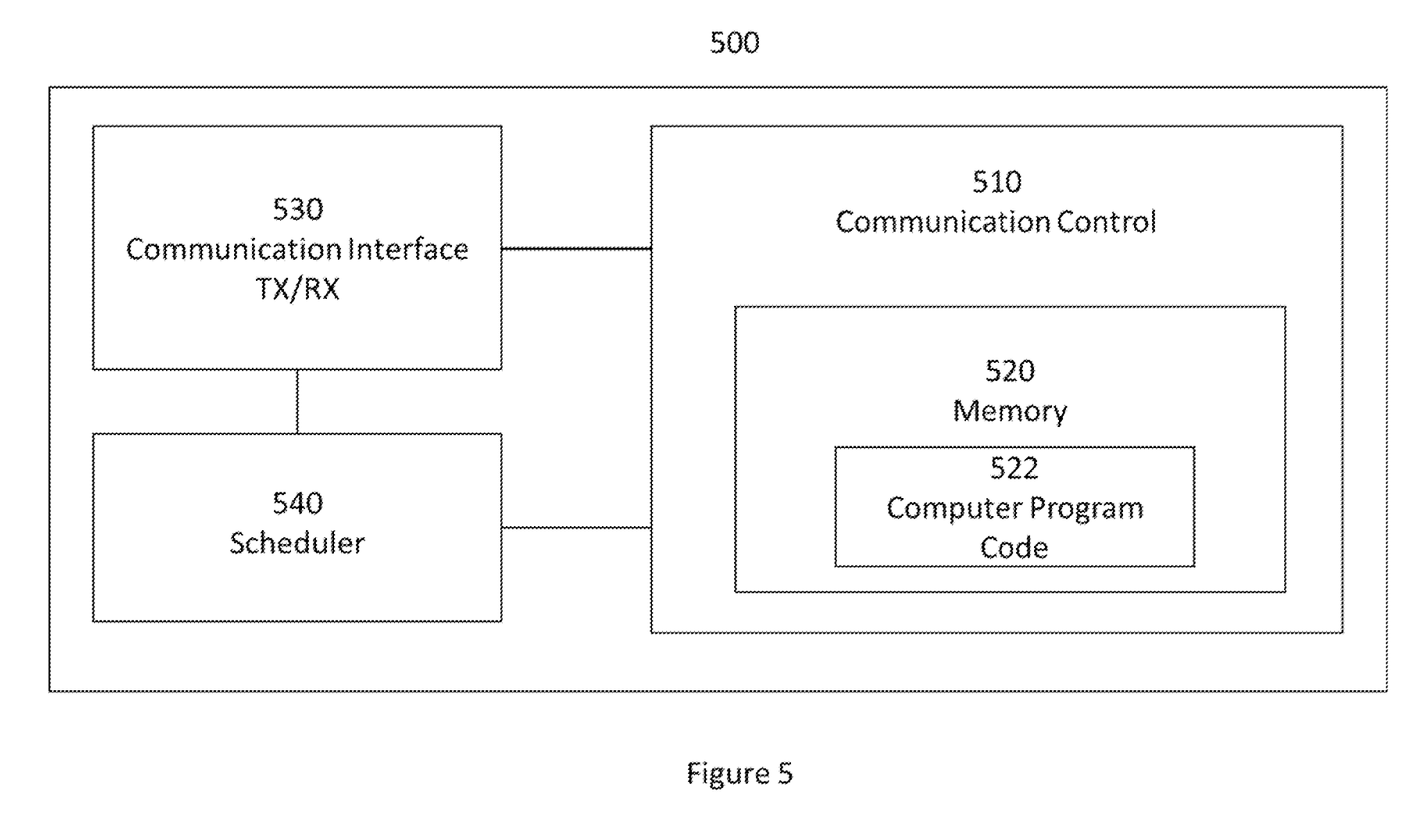
FIG. 5 illustrates an exemplary embodiment of an apparatus.

The apparatus 500 of FIG. 5 illustrates an example embodiment of an apparatus that may be an access node or be comprised in an access node. The apparatus may be, for example, a circuitry or a chipset applicable to an access node to realize the described embodiments. The apparatus (500) may be an electronic device comprising one or more electronic circuitries. The apparatus (500) may comprise a communication control circuitry (510) such as at least one processor, and at least one memory (520) including a computer program code (software) (522) wherein the at least one memory and the computer program code (software) (522) are configured, with the at least one processor, to cause the apparatus (500) to carry out any one of the example embodiments of the access node described above.

The memory (520) may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus (500) may further comprise a communication interface (530) comprising hardware and/or software for realizing communication connectivity according to one or more communication protocols. The communication interface (530) may provide the apparatus with radio communication capabilities to communicate in the cellular communication system. The communication interface may, for example, provide a radio interface to terminal devices. The apparatus (800) may further comprise another interface towards a core network such as the network coordinator apparatus and/or to the access nodes of the cellular communication system. The apparatus (800) may further comprise a scheduler (840) that is configured to allocate resources.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2-4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including computer program code;
   the at least one memory and the computer program code configured to, with the at least one processor, cause the apparatus at least to perform:
   receiving a definition for determining a key performance indicator of a cellular communication network based on raw metrics data associated with remotely defined metrics configured for network node programmability and multivendor interoperability;
   receiving a request for executing an action of determining the key performance indicator according to the definition received;
   as a response to receiving the request, obtaining the raw metrics data and determining the key performance indicator according to the definition;
   transmitting the key performance indicator using an interface; and
   establishing a subscription with a radio access network intelligent controller according to a test condition based on the key performance indicator and one or more actions associated with the test condition, wherein
   the definition and the request are received within a threshold latency from the radio access network intelligent controller that is a near-real time radio access network intelligent controller configured to steer traffic to resources that satisfy quality of metrics required by individual connections,
   the key performance indicator comprises composite available capacity, and the definition comprises one or more mappings between policy parameter naming and performance management parameters within the apparatus associated with an averaging period of an algorithm regarding a time period that a specific measure refers configured to provide feedback on tuning configuration parameters used in the definition of the key performance indicator.

2. The apparatus according to claim 1, wherein the interface comprises an E2 interface.

3. The apparatus according to claim 1, wherein the interface comprises an X2 interface.

4. The apparatus according to claim 1, wherein the raw metrics data is generated by a distributed unit.

5. The apparatus according to claim 1, wherein the definition comprises an algorithm to be used for determining the key performance indicator.

6. The apparatus according to claim 1, wherein the apparatus comprises a radio access network node.

7. A method, comprising:
receiving a definition for determining a key performance indicator of a cellular communication network based on raw metrics data associated with remotely defined metrics configured for network node programmability and multivendor interoperability;
receiving a request for executing an action of determining the key performance indicator according to the definition received;
as a response to receiving the request, obtaining the raw metric data and determining the key performance indicator according to the definition;
transmitting the key performance indicator using an interface; and
establishing a subscription with a radio access network intelligent controller according to a test condition based on the key performance indicator and one or more actions associated with the test condition, and wherein the definition and the request are received within a threshold latency from the radio access network intelligent controller that is a near-real time radio access network intelligent controller configured to steer traffic to resources that satisfy quality of metrics required by individual connections,
the key performance indicator comprises composite available capacity, and
the definition comprises one or more mappings between policy parameter naming and performance management parameters associated with an averaging period of an algorithm regarding a time period that a specific measure refers configured to provide feedback on tuning configuration parameters used in the definition of the key performance indicator.

8. The method according to claim 7, wherein the raw metrics data is generated by a distributed unit.

9. The method according to claim 7, wherein the definition comprises an algorithm configured to determine the key performance indicator.

10. The method according to claim 7, wherein the interface comprises an E2 interface or an X2 interface.

11. A computer program embodied on a non-transitory computer-readable medium, said computer program comprising computer readable instructions which, when executed by a computer, cause the computer to execute a computer process comprising:
receiving a definition for determining a key performance indicator of a cellular communication network based on raw metrics data associated with remotely defined metrics configured for network node programmability and multivendor interoperability;
receiving a request for executing an action of determining the key performance indicator according to the definition received;
as a response to receiving the request, obtaining the raw metric data and determining the key performance indicator according to the definition;
transmitting the key performance indicator using an interface; and
establishing a subscription with a radio access network intelligent controller according to a test condition based on the key performance indicator and one or more actions associated with the test condition, and wherein the definition and the request are received within a threshold latency from the radio access network intelligent controller that is a near-real time radio access network intelligent controller configured to steer traffic to resources that satisfy quality of metrics required by individual connections,
the key performance indicator comprises composite available capacity, and
the definition comprises one or more mappings between policy parameter naming and performance management parameters associated with an averaging period of an algorithm regarding a time period that a specific measure refers configured to provide feedback on tuning configuration parameters used in the definition of the key performance indicator.

* * * * *